United States Patent [19]

Sheridan

[11] Patent Number: 5,670,264

[45] Date of Patent: Sep. 23, 1997

[54] THERMAL BARRIER

[75] Inventor: Steven William Sheridan, Manchester, Mo.

[73] Assignee: Shertech, Inc., St. Louis, Mo.

[21] Appl. No.: 523,225

[22] Filed: Sep. 5, 1995

Related U.S. Application Data

[63] Continuation-in-part of Ser. No. 240,821, May 10, 1994, abandoned.

[51] Int. Cl.$^6$ .................................. B32B 3/28; B32B 15/00
[52] U.S. Cl. .................................... 428/594; 428/604
[58] Field of Search ................................. 428/603, 604, 428/594, 593

[56] References Cited

U.S. PATENT DOCUMENTS

| | | | |
|---|---|---|---|
| 1,934,174 | 11/1933 | Dyckerhoff | 154/28 |
| 2,179,057 | 11/1939 | Schuetz | 154/45 |
| 2,180,373 | 11/1939 | Sibley et al. | 189/34 |
| 2,190,490 | 2/1940 | Sendzimir | 428/604 |
| 2,212,481 | 8/1940 | Sendzimir | 428/494 |
| 2,704,587 | 3/1955 | Pajak | 189/34 |
| 2,777,786 | 1/1957 | Schwartz et al. | 52/809 |
| 2,926,761 | 3/1960 | Herbert, Jr. | 189/34 |
| 3,151,712 | 10/1964 | Jackson | 52/792 |
| 3,190,412 | 6/1965 | Rutter et al. | 428/604 |
| 3,196,533 | 7/1965 | Ida et al. | 52/806 |
| 3,981,689 | 9/1976 | Trelease | 428/603 |
| 4,037,751 | 7/1977 | Miller et al. | 428/594 |
| 4,221,843 | 9/1980 | Mundy | 428/494 |
| 4,298,061 | 11/1981 | Hoeffken | 165/170 |
| 4,343,866 | 8/1982 | Oser et al. | 428/593 |
| 4,386,128 | 5/1983 | Yoshikawa | 428/152 |
| 4,703,159 | 10/1987 | Blair | 219/78.12 |
| 5,011,743 | 4/1991 | Sheridan et al. | 428/600 |
| 5,111,577 | 5/1992 | Sheridan et al. | 29/890.039 |
| 5,244,745 | 9/1993 | Seksaria et al. | 428/493 |

FOREIGN PATENT DOCUMENTS 4-227855 8/1992 Japan ........................ 428/593

Primary Examiner—John Zimmerman
Attorney, Agent, or Firm—Senniger, Powers, Leavitt & Roedel

[57] ABSTRACT

A heat shield for providing thermal insulation is made of several uniform thickness aluminum sheets. Each sheet has stand-offs formed therein to space adjacent sheets and create air pockets in the heat shield.

10 Claims, 2 Drawing Sheets

THERMAL BARRIER

This application is a continuation-in-part application of U.S. patent application Ser. No. 08/240,821 filed May 10, 1994, entitled "Heat Shield", now abandoned.

BACKGROUND OF THE INVENTION

1. Field of the Invention

The present invention relates to a heat shield which provides thermal insulation from a heat source. In particular, the present invention relates to improvements in the structure and method of manufacturing a heat shield. The improvements include manufacturing the heat shield from a plurality of layers of substantially identical metallic or other formable sheets with each sheet having stand-offs formed on each side to thereby provide air pockets between adjacent sheets of the shield that enhance the thermal resistance and reduce the shield weight. Non-planar heat shields, or shields formed with angular or curved configurations, are produced by pre-forming the sheets prior to their assembly into the layered sheet shield to prevent the collapse of the air pockets between adjacent sheets which would otherwise occur if the sheets were first layered and then formed into their curved or angular non-planar configuration. Further, the production of the non-planar heat shields may include a final forming step which biases the sheets toward one another to increase the inter-laminar friction and thereby dampen vibration and strengthen the heat shield structure.

2. Description of the Related Art

Heat shields are often employed to separate objects that are sensitive to heat from sources of heat close to those objects. Various heat shields have been developed for thermal insulation purposes. For instance, U.S. Pat. No. 2,179,057 discloses a thermally insulating laminate comprised of sheets of asbestos material having stand-offs extending from one side of each sheet. The stand-offs space the asbestos sheets in the laminate to create air pockets between the sheets and thereby increase the thermal resistance and decrease the weight to size ratio of the laminate. The laminate is assembled such that the stand-offs of each adjacent sheet are oriented in mutually opposed directions to maximize the air pocket volumes.

The aforementioned asbestos laminate has several disadvantages foremost of which is that recent focus on the health effects of exposure to asbestos has reduced the desirability of asbestos. Further, since the stand-offs are only formed on one side of the sheets, extra care must be taken during assembly to achieve the required orientation to form the air pockets between the lamina.

U.S. Pat. No. 2,926,761 discloses another thermally insulating laminate. This laminate is comprised of a honeycomb core made from 0.002 inch thick stainless steel foil. Both ends of the honeycomb cells are capped by additional stainless steel foil lamina which form the exterior sides of the heat shield. This configuration is disadvantaged in that it is relatively expensive to manufacture the honeycomb core. In addition, because the laminate is not divided into multiple sections through its thickness, significant heat transfer may take place through the heat shield via the honeycomb cell walls thereby reducing the overall thermal resistance of the heat shield.

U.S. Pat. No. 4,703,159 discloses yet another thermally insulating laminate primarily intended for use in space vehicles. The laminate is comprised of dimpled 0.002 inch thick nickel-based alloy foil stacked between thicker nickel-based alloy side sheets which provide increased crush resistance to the heat shield as well as a neat appearance. The lamina are brazed together in this laminate to increase the overall stiffness of the structure. However, brazing the lamina reduces the thermal resistance of the heat shield and increases manufacturing costs.

U.S. Pat. No. 5,011,743 discloses still another heat shield configuration comprised of dimpled 0.002 inch thick aluminum foil. One alternate embodiment employs a scrim attached to one side of the heat shield. Another alternate embodiment uses a 0.020 inch thick carrier plate on one side to increase the heat shield crush resistance. With each of these alternate embodiments, a separate material must be stocked and handled which increases manufacturing costs. The addition of the scrim or carrier plate also adds weight to the heat shield. In addition, with the carrier plate embodiment, the thermal resistance through the heat shield is reduced because the heat travels around the edges of the foil via the carrier plate.

As alluded to above, each of these prior art heat shields has disadvantages. Either the heat shield is unnecessarily expensive, unnecessarily heavy, or has an unnecessarily reduced thermal resistance.

Each of the aforementioned patent disclosures provides a sufficient method of manufacture to produce planar heat shields. However, non-planar heat shields are frequently desired to conform to the shape of a particular component which must be insulated. If a typical prior art planar heat shield is bent to conform to the shape of the component, the air pockets between the lamina collapse and the lamina come into contact with each other at the bend, thereby reducing the thermal resistance. Since the air pockets provide the majority of the thermal insulation, collapse of the air pockets significantly reduces the overall thermal resistance of the heat shield. Therefore, an improved non-planar heat shield which eliminates or reduces the potential for air pocket collapse is desirable.

SUMMARY OF THE INVENTION

The present invention solves the aforementioned problems by providing a heat shield which is relatively light weight, has good thermal insulation properties, and may be manufactured at a relatively low cost. In addition, the problems associated with manufacturing non-planar heat shields are eliminated by the shield of the invention manufactured according to the method of the invention.

The preferred embodiment of the heat shield of the present invention is a laminate formed entirely of equal thickness metallic sheets, preferably sheets of aluminum each having a nominal thickness of 0.006 inches. Each of the sheets also has stand-offs or pyramidal points protruding from both surfaces to space the sheets apart and create air pockets between the lamina while minimizing contact between adjacent sheets. The stand-offs may be formed by dimpling the sheets between mandrels as is well-known in the art. These stand-offs or points occupy the entire area of the sheets with no intervening flat areas of the sheet left between adjacent points, thereby giving the sheets increased stiffness which increases the overall crush resistance of the heat shield. In the preferred embodiment, the sheets are connected together by forming folds along the edges of the sheets. This fastening method is inexpensive but effective for most applications.

Non-planar heat shields, or shields having angular or curved configurations, are made by pre-forming each dimpled sheet to a configuration which is near that of the final desired shape prior to stacking the sheets together. By preforming the sheets, the air pockets created between the sheets do not collapse during manufacture. Each of the preformed dimpled sheets is cut so that it has a perimeter edge substantially identical to the final desired perimeter of the heat shield. The sheets are stacked and their edges are folded together to thereby join the sheets. Once joined, the heat shield is final formed to the final heat shield configuration. This final forming operation biases the sheets toward one another so that inter-laminar contact is assured. This inter-laminar contact increases the inter-laminar friction which dampens vibrations in the sheets and increases the strength of the final structure. Thus manufactured, the heat shields provide increased thermal resistance at a lower overall weight and cost than prior art heat shields.

BRIEF DESCRIPTION OF THE DRAWINGS

Further objects and features of the present invention are revealed in the following Detailed Description of the Preferred Embodiment of the invention and in the drawing figures wherein.

DETAILED DESCRIPTION OF THE PREFERRED EMBODIMENT

Figure 1:
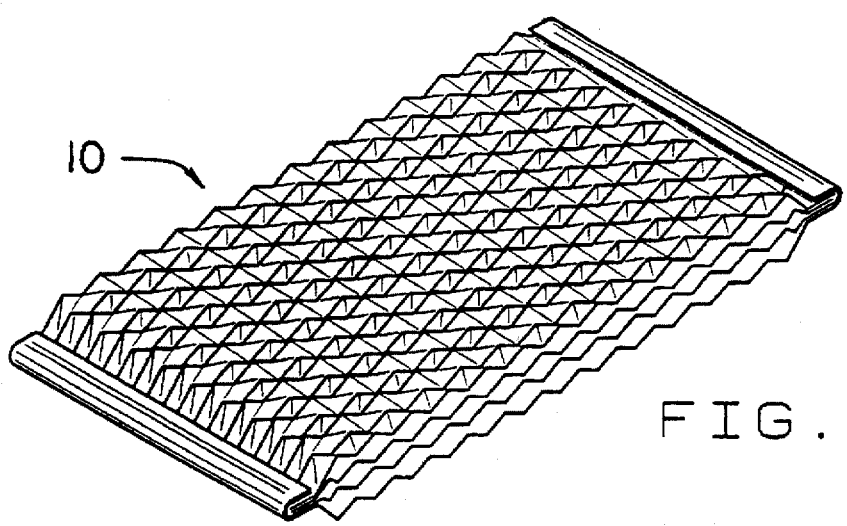
FIG. 1 is an orthographic projection of the heat shield of the present invention.
Figures 2, 5, 6:
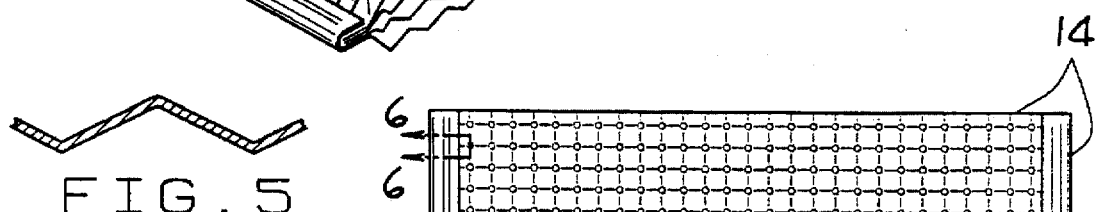
FIG. 2 is a top plan view of the heat shield.
FIG. 5 is a cross-sectional view of a single sheet within the heat shield taken in the plane of line 5—5 of FIG. 2.
FIG. 6 is a cross-sectional view of a single sheet taken in the plane of line 6—6 of FIG. 2.

The heat shield or thermal barrier 10 of the present invention is generally comprised of a plurality of metallic sheets 12. Each sheet 12 has a peripheral edge 14 and a substantially uniform thickness between its opposite surfaces 16. Each sheet in the heat shield 10 is substantially identical in every respect. In the preferred embodiment, these sheets are nominally 0.006 inches or 6 mils thick and are made from A.S.T.M. 1145-0 95% aluminum alloy. Although the preferred embodiment uses 6 mil nominal thickness sheets, any thickness sufficient to provide adequate crush resistance as well as high thermal resistance and low thermal absorbance may be used. Likewise, not only may aluminum be used, but also any other material providing adequate properties of thermal resistance, weight, cost and strength may be used for the sheets.

Each sheet 12 has stand-offs 20 formed as pyramidal points extending from both surfaces 16. The stand-offs 20 space the adjacent sheets 12 and their pointed configuration minimizes contact areas 22 between adjacent sheets and thereby minimizes the heat transfer between the sheets. The stand-offs 20 extend from both surfaces 16 of the sheets 12 so that both surfaces of the sheet are identical. This feature facilitates in the assembly of the heat shield 10 since no care need be taken as to which way a sheet 12 is facing when being assembled. Although in the preferred embodiment the stand-offs or pyramidal points 20 are formed by embossing dimples 24 in the opposing surface 16 of the sheet, any suitable means known to those skilled in the art is acceptable to minimize the contact areas 22 between the adjacent sheets 12 of the heat shield 10. Thus configured, each stand-off 20 has a corresponding dimple 24 on the opposite surface of the sheet, and each dimple has a stand-off on the opposite surface of the sheet.

In addition to minimizing the contact areas 22 between the sheets 12, the stand-off 20 and dimple 24 configuration of the preferred embodiment adds stiffening to each of the sheets to increase the heat shield 10 crush resistance and thereby reduce the damage to the heat shield during assembly, transport and use. With the entire surface area of both sides of each sheet completely covered with alternating stand-offs 20 and dimples 24 in every direction, a bend or crease cannot propagate across the sheet without encountering a stand-off or dimple. Because it is more difficult or requires more force to bend or crease across a stand-off or dimple than it is to bend a crease across a flat sheet, covering the entire surface areas of both sides of the sheets increase their strength and resistance to unintentionally formed bends and creases such as those that would occur during use of the shield in an adverse environment. Preferably, the stand-offs 20 are uniformly spaced but alternate configurations may be used.

The stand-offs 20 of adjacent sheets 12 also act to hold the sheets apart so as to create air pockets 30 between the sheets. These air pockets 30 provide significantly increased thermal resistance to thereby limit the heat transfer through the heat shield 10.

In the preferred embodiment, adjacent sheets 12 of the heat shield 10 are connected together by forming overlapping folds 40 along the peripheral edges 14 of the sheets. Although two folds 40 are shown in the accompanying figures, the entire periphery may be folded to thereby securely fasten the sheets 12 together. In order to further secure the sheets 12 together, the folds 40 may be crimped at various spaced distances along the folds. Folds 40 are used in the preferred embodiment to limit the conductive heat transfer paths through the heat shield 10.

Once the sheets are dimpled, they are arranged in layers in assembling the heat shield. Assembly is accomplished by stacking the sheets and then connecting them together. Optimally, the sheets are stacked together with the dimple and stand-off configurations of adjacent sheets positioned such that the air pockets between the sheets are maximized and the contact areas between the sheets are minimized. This is accomplished by positioning the tips of the stand-offs of the adjacent sheets adjacent one another. Thus positioned, the thermal resistance of the heat shield is maximized.

Numerous alternate methods may be used to manufacture the heat shields because most of the manufacturing steps may be accomplished in any of several ways. For instance, many methods are available for forming the stand-offs on the sheets. The sheets may be rolled between two textured rollers to create the dimples and corresponding stand-offs. Alternatively, the sheets may be pressed between two textured planar mandrels to create the dimples.

Many alternate methods are also available to connect the sheets together. For instance, the peripheral edges of the sheets may be folded as shown in the accompanying figures so that the edges are connected. The folds may be reinforced by crimping the folds to further assure that the sheets will not become disassembled during use. Alternatively, the sheets may be welded, brazed, or even bonded together with high temperature adhesives.

Alternate dimple and stand-off configurations may be used to provide differing heat shield characteristics. Likewise, thermally absorbent or reflective coatings may be applied to either or both of the surfaces of each sheet to further modify the thermal characteristics of the heat shield. Further, any number of sheets may be used depending upon the desired heat resistance.

Figure 3:
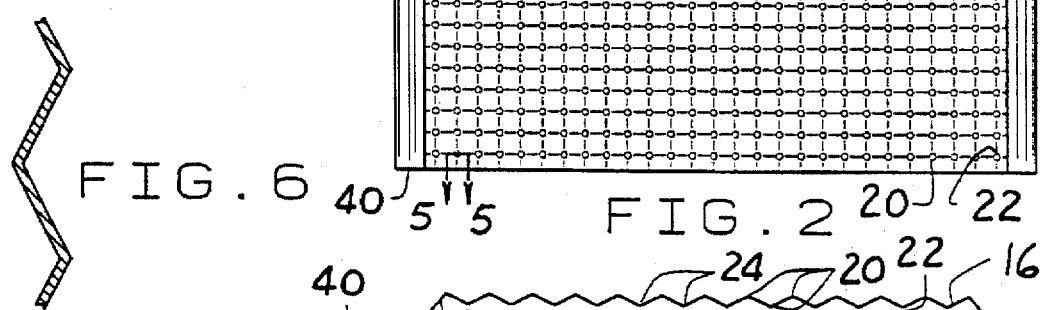
FIG. 3 is a front elevation view of the heat shield.
Figure 4:
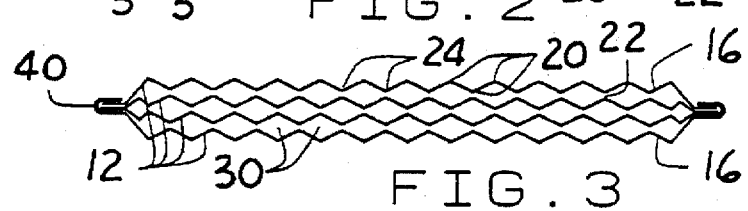
FIG. 4 is a front elevation view of the heat shield showing a non-planar heat shield configuration.

The methods of manufacture outlined above are acceptable for producing planar heat shields. However, non-planar heat shields are frequently desired to fit around various components. The term "non-planar" is used to mean that the heat shield has at least one bend, either angular or curved, formed in the layers of the shield. FIG. 3 shows a planar heat shield and FIG. 4 shows a non-planar heat shield under this definition.

If a non-planar heat shield is produced by first assembling a planar heat shield and then bending the shield into the desired shape, the air pockets between layers of the shield are collapsed at the bends and the layers of the shield contact each other at the bend. This is due to the radius of curvature closer to the center of the bend being smaller than the radius of curvature farther from the center of the bend. Thus, the layer length required closer to the center of curvature of the bend is less than the layer length required farther from the center of curvature of the bend. If the heat shields are formed from a plurality of flat sheets that are then bent, the sheet length on opposite sides of the shield is the same. Thus, the air pockets collapse at the bend to compensate for the disparity between the required and provided material lengths. The contact between adjacent layers of the shield at the bend also significantly reduces the thermal resistance at the bend where, depending on the application of the shield, this reduction may not be desired.

In order to prevent the air pockets from collapsing at bends in a heat shield, the non-planar heat shield of the invention is constructed with each individual sheet pre-formed such that it has the appropriate radius of curvature and material length between opposite edges of the sheet at opposite sides of the bend. The pre-formed sheets are stacked together and the assembly is completed as with the planar heat shields. When the pre-formed sheets are assembled, no further significant bending is required and thus the air pockets do not collapse. The pre-forming step is particularly necessary when the angle of the bend exceeds 45°.

Figure 4A:
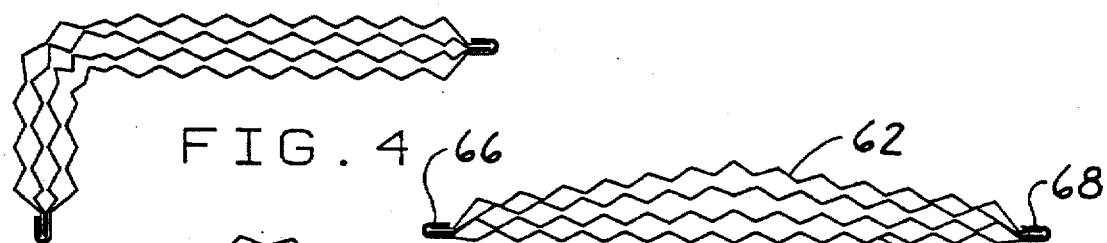
FIG. 4A is a front elevation view of the heat shield showing a pre-formed shape prior to final forming.
Figure 4B:
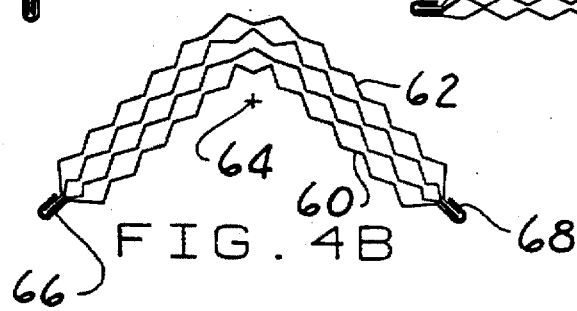
FIG. 4B is a front elevation view of the heat shield of FIG. 4A after final forming.

Referring to FIG. 4B, the heat shield has an approximately 90° bend thereby making the heat shield non-planar. It is readily apparent that the sheets closer the center of curvature of the bend have a smaller radius and shorter overall length between their opposite edges, at opposite sides of the bend. Progressing from the interior sheet 60 at the interior of the bend curvature to the exterior sheet 62 farthest from the bend center of curvature 64, the lengths of the sheets between their opposite edges 66, 68 at opposite sides of the bend are increasingly longer and the radius of the bend in each sheet is increasingly larger. This enables the sheet layers to be assembled together in a non-planar shield with adjacent layers maintaining their spacing at the bend in the shield. When assembled, the heat shield retains substantially uniform thickness air pockets and minimal contact areas everywhere including at the bends. Thus, the heat transfer through the thickness of the heat shield is not substantially different in the area of the bend than it is remote from the bend. A substantially uniform heat transfer occurs everywhere along the heat shield and no unintended heat sinks are formed in the shield due to the inclusion of the bend in the shield.

Non-planar heat shields with uniform thickness air pockets at the bends as well as minimum contact areas may be formed according to at least two methods. The first method is to pre-form each sheet to essentially its final shape in the heat shield and then stacking these preformed sheets during the assembly of the heat shield. Each sheet layer from the sheet closest to the bend center of curvature to the sheet farthest from the center of curvature is progressively larger in the length dimension that crosses the bend. Although the lengths of the sheets become progressively larger, their opposite edges at opposite sides of the bend are all aligned and connected.

A second method of manufacturing the heat shield involves partially pre-forming each of the sheets as shown is FIG. 4A. Sheets adjacent the exterior of the bend to be formed in the shield are provided with a longer length between their opposite edges 66, 68 at opposite sides of the bend than are the sheets closer to the center of curvature 64 of the bend. This is accomplished by forming an initial bend in the exterior sheet(s) to compensate for the longer length. Progressing from the interior sheet 60 closest the final center of curvature to the exterior sheet 62 farthest from the final center of curvature, the radius of the bend in each sheet is decreasingly smaller. The preformed sheets are stacked and connected together prior to the final forming operation during which the final non-planar heat shield shape is established. During the final forming operation, the excess length in the exterior sheet(s) is taken up in the bend formed in the shield producing substantially uniform air pocket configuration between the layers of the heat shield including at the bend, and thereby producing a substantially uniform heat transfer through the heat shield.

The second alternate forming method outlined above has the advantage of permitting subsequent intermediate operations to be performed on a substantially flat component rather than a fully formed shield. As is apparent from the drawings, the shield is generally flat until it is bent along the sheet bends forming the final, non-planar shield. Thus, the overall manufacturing expense may be reduced by one or the other of the methods depending upon the final configuration.

Figure 7:
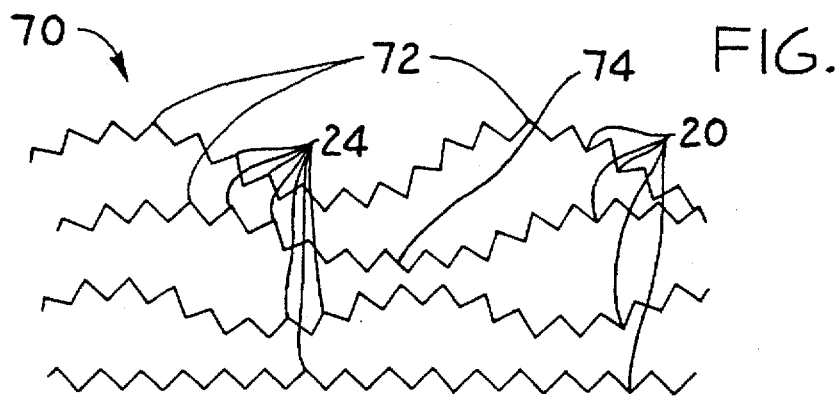
FIG. 7 is a partial cross-sectional view of the heat shield after intermediate forming.

A third method of manufacturing the heat shield involves embossing each of the sheets 12 with stand-offs 20 and dimples 24 as with the two previously described methods. The embossed sheets 12 are bent in a predetermined pattern of contours 70 as shown in FIG. 7. Generally, the contours 70 are formed by producing peaks 72 and valleys 74 in the embossed sheets 12 thereby superimposing the peaks and valleys on the pattern of stand-offs 20 and dimples 24 made during the embossing process. Thus, within a section of the sheets 12 having contours 70, there are peaks 72 and valleys 74 and generally smaller stand-offs 20 and dimples 24 spaced throughout the peaks and valleys Just as the stand-offs and dimples are spaced throughout the initially generally planar sections of the sheets without the contours. The contours 70 may have any one of several shapes but in the preferred embodiment the contours have sinusoidal shapes with a constant amplitude, period and mean value. Alternately, the amplitude, period and mean value may vary or the contours 70 may have other common continuous shapes. Generally, the contours are more closely spaced and/or formed with taller peaks at some locations on some of the sheets to compensate for the additional material requirements of those locations and sheets in the final heat shield. In particular, the contours are made closer and/or taller at adjacent the exterior of a bend in the final heat shield to provide those areas with a longer effective length. As previously disclosed, the longer effective lengths are required to generate smooth bends and to prevent air pocket collapse as the distance from the sheet to the center of curvature increases.

Figure 8:
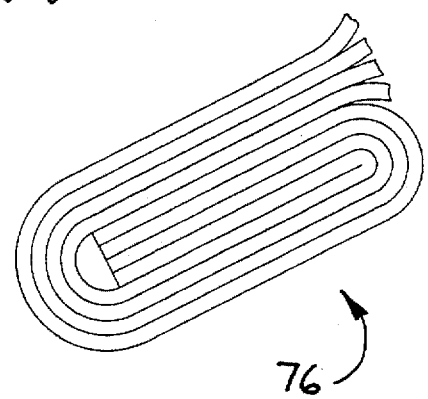
FIG. 8 is a cross-sectional view of a heat shield showing a double fold edge joint.

The embossed and contoured sheets are stacked and cut to a substantially identical projected shape and area. Although alternate joining methods may be used, in the preferred embodiment of the third method, each of the edges of the sheets are joined by double-folds 76 as shown in FIG. 8 to lock the edges of each sheet in place and to prevent the sheets from being separated during the final shaping step. The final shaping step is completed by bending the assembled sheets to the final heat shield shape. As the sheets are bent to the final shape, the closer spaced contours or those with taller peaks spread out and take on the final heat shield shape. Thus, the contours are stretched so that their amplitudes diminish during the final shaping step and so that they are eliminated or nearly eliminated when the final shape is achieved.

Figure 9A:
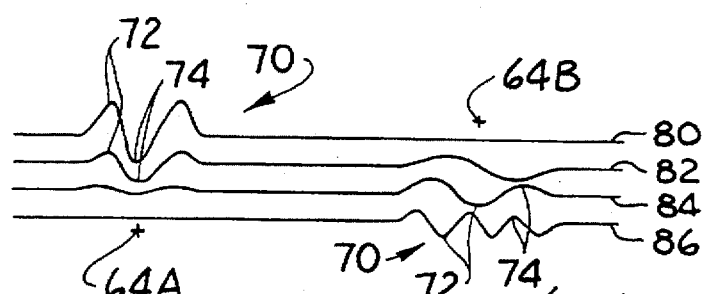
FIG. 9A is a partial cross-sectional schematic of the heat shield after intermediate forming.
Figure 9B:
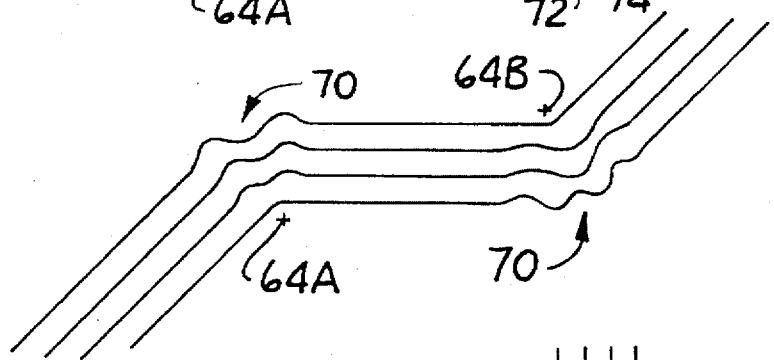
FIG. 9B is a partial cross-sectional schematic of the heat shield during final forming.
Figure 9C:
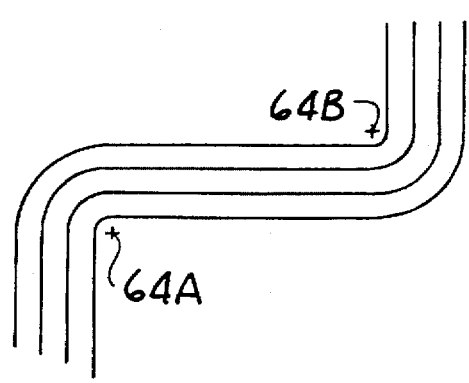
FIG. 9C is a partial cross-sectional schematic of the heat shield after final forming.

FIGS. 9A–C further illustrate the final forming process. For illustration purposes, the stand-offs and dimples are not shown in FIGS. 9A–C so that the contours and their changing shapes during the final forming process are more apparent. A stack of sheets with contours prior to final forming is shown in FIG. 9A. Before the final forming process begins, the height of the contours of the sheets farther from the final center of curvature 64A are greater than the height of the contours of the sheets closer to the final center of curvature 64A. Also before the final forming process begins, the distance between each of the contours of the sheets farther from the final center of curvature 64B is smaller than the distance between each of the contours of the sheets closer to the final center of curvature 64B. Greater contour height and/or closer contours provide more material in an equivalent projected area of the sheet. During the final forming process, the height and spacing of the contours reduces and increases, respectively, as the additional material is used by the exterior sheets. Thus, as shown in FIG. 9B and C, the height of the contours reduces and the spacing of the contours increases as the forming process is performed.

Because the contours are stretched out during the final forming step, the sheets are biased toward one another and an in-plane stress is developed in each of the sheets. Depending upon the location, the stress may either be tensile or compressive. The term "in-plane" is used to describe the general direction of the stress, but it should be understood that the sheets are not usually planar and the in-plane stress direction varies throughout the heat shield. The stresses bias the separate sheets against one another so that the distance between the outer sheets 80, 86 is reduced and the outer sheets grip the inner sheets 82, 84 thereby increasing the inter-laminar friction between each of the sheets 80, 82, 84, 86. This inter-laminar friction dampens the vibratory response of the final formed heat shield and prevents one sheet within the heat shield from vibrating against other sheets. Otherwise, the vibrating sheets would rattle and abrade one another. Further, the inter-laminar friction partially locks each sheet against the adjacent sheets to stiffen the overall heat shield. Thus, heat shields manufactured by this third method are stronger and less prone to vibration than heat shields made by other known prior art methods.

Because the contours stretch out during the final forming step to compensate for the differing length requirements at differing distances from the center of curvature, the air pockets between the sheets are not crushed. If the size of the air pockets between adjacent sheets are reduced, the overall thermal resistance of the heat shield is reduced.

Further, because of the contours placed in the sheets during the intermediate contour forming step may not be eliminated entirely during the final forming step, the final sheets may not follow the overall shape of the finished heat shield exactly. Rather than conforming to the finished shape exactly, the sheets may have local, minor eccentricities or deviations from the exact finished shape. Further, because each of the sheets is joined to the other sheets in the heat shield, movement of the ends of each sheet are restrained by the other sheets. Still further, when heat is applied to a sheet, it will grow lengthwise due to thermal expansion. However, when the ends of a sheet are restrained and heat is applied, either stresses develop in the sheet or the sheet deforms out of plane. If the sheets were constrained to only grow in the in-plane direction of a heat shield, stresses would develop in both the expanding sheet, in adjacent sheets and in the joints connecting the sheets, when thermal growth occurs. Eccentricities in sheets promote lateral displacement or buckling out of plane rather than the development of stresses. Therefore, because of the local eccentricities, each sheet is able to deform laterally rather than being constrained to grow in the in-plane direction. Because the temperature of the typical environment of the heat shield varies, the lateral growth reduces stresses in the assembled heat shield.

As will be appreciated by those of ordinary skill in the art, the final forming step of the third method of manufacturing may be used in combination with the previous two methods. Thus, the sheets may be biased together in any of the previously described methods to produce the advantages inherent in the final heat shield produced by the third method.

In the preferred embodiment, the total heat shield thickness is approximated 0.2 inches. However, depending upon the stand-off and dimple heights used as well as the number of metallic sheets used, different total thicknesses are available. The thermal characteristics of the heat shields will also naturally vary with each of these parameters.

While the present invention has been described by reference to a specific embodiment, it should be understood that modifications and variations of the invention may be constructed without departing from the scope of the invention defined in the following claims.

What is claimed is:

1. A heat shield comprising a plurality of sheets arranged in a stack, each of the sheets having a centrally located field surrounded by an uninterrupted peripheral edge, the plurality of sheets being joined along the edges, a portion of the plurality of sheets having standoffs adapted to contact at least one adjacent sheet of the plurality of sheets to generally separate each of the plurality of sheets from the adjacent sheet thereby creating a space between each of the plurality of sheets and the adjacent sheet, each of the plurality of sheets contacting the adjacent sheets at a plurality of separate standoff locations within the field and being biased toward the adjacent sheets to inhibit the plurality of sheets from contacting each other except at the standoff locations and edges and to encourage the plurality of sheets to continuously contact each other at the plurality of separate standoff locations.

2. The heat shield of claim 1 wherein the edges of the plurality of sheets are joined by double folding each of the edges together.

3. The heat shield of claim 1 wherein the standoffs in the portion of the plurality of sheets are formed by bending the portion of the plurality of sheets.

4. The heat shield of claim 1 wherein the portion of the plurality of sheets having standoffs consists of all of the plurality of sheets.

5. The heat shield of claim 1 wherein each of the plurality of sheets is in tension in an in-plane direction thereby increasing the rigidity of the heat shield.

6. The heat shield of claim 1 wherein each of the plurality of sheets is of a substantially equal thickness.

7. A heat shield comprising a plurality of sheets arranged in a stack, each of the sheets having a centrally located field extending in an in-field direction and being surrounded by an uninterrupted peripheral edge, the plurality of sheets being fixedly joined along the edges so the edges of the plurality of sheets are substantially immoveable with respect to each other when the plurality of sheets are subjected to in-plane stresses while being deformed to a final shape, a portion of the plurality of sheets having standoffs in local contact with at least one adjacent sheet of the plurality of sheets to generally separate each of the plurality of sheets from the adjacent sheet thereby creating a space between each of the plurality of sheets and the adjacent sheet, each of the plurality of sheets being deformed subsequent to being joined to the other sheets of the plurality of sheets to form the heat shield into the final shape and to develop an in-plane stress in each sheet thereby increasing the rigidity of the heat shield.

8. The heat shield of claim 7 wherein the edges of the plurality of sheets are joined by double folding each of the edges together.

9. The heat shield of claim 7 wherein the standoffs in the portion of the plurality of sheets are formed by bending the portion of the plurality of sheets.

10. The heat shield of claim 7 wherein the portion of the plurality of sheets having standoffs consists of at least a part of all of the plurality of sheets.

* * * * *